United States Patent Office 2,859,768
Patented Nov. 11, 1958

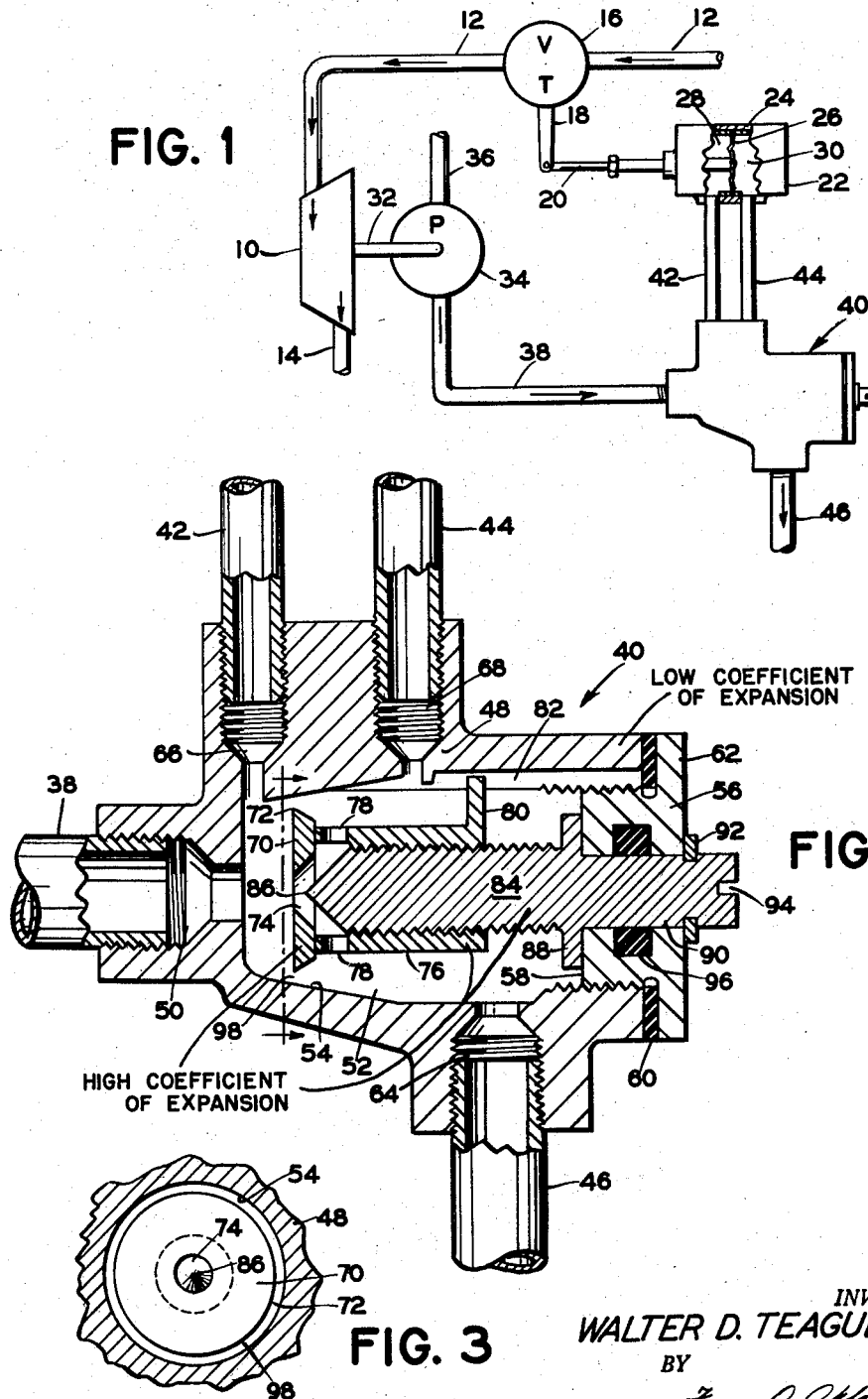

2,859,768

VALVE FOR FLUID PUMPING SYSTEM AND REGULATION MEANS THEREFOR

Walter D. Teague, Jr., Alpine, N. J., assignor to Bendix Aviation Corporation, Teterboro, N. J., a corporation of Delaware Application May 7, 1953, Serial No. 353,496

6 Claims. (Cl. 137—468)

This invention relates generally to fluid pumping systems and more particularly to an improved fluid pumping system including a novel thermo-responsive regulator for controlling the operation thereof.

It has been found that in fluid pumping systems of the type wherein a prime mover having a power output shaft the rotational velocity or speed of which varies as a function of power input into the mover is utilized to drive a pump, that variations in the temperature of the fluid being pumped effects the loading of the pump and hence the speed of the prime mover with the end result that pump output varies. For example, it has been found that as the temperature of the fluid increases the pump tends to unload with the result that the speed of the prime mover and hence pump speed and output increases. In general, therefore, the quantity of fluid delivered by the pump varies with changes in the temperature of the fluid.

The present invention contemplates and has for one of its objects the provision of an improved fluid pumping system that is constructed and arranged to deliver a substantially constant supply of fluid irrespective of changes in the temperature thereof.

To the above end the improved system contemplated herein includes a prime mover having control means for regulating the speed thereof, a pump driven by the prime mover for pumping a fluid through the system and a novel thermo-responsive regulator connected to the pump outlet and the control means of the prime mover. The regulator includes a thermo-responsive means operative in response to the temperature of the fluid to control the flow of fluid through the regulator as a function of the temperature of the fluid and to simultaneously produce a signal that is transmitted to and operates the control means of the prime mover to the end that the speed of the prime mover, and hence the output of the pump, is also varied as a function of the temperature of the fluid. Thus, by controlling both the flow of fluid through the regulator as well as the speed of the prime mover and hence pump output as a function of the temperature of the fluid, the novel system contemplated herein provides a substantially constant supply of fluid to its point of use irrespective of the temperature of the fluid.

The above and other objects and advantages of the present invention will appear more fully hereinafter from a consideration of the following description taken in connection with the accompanying drawing wherein one embodiment of the instant invention is shown by way of example. It is to be understood, of course, that this drawing is by way of example only and is not to be construed as limiting the scope of the present invention.

In the accompanying drawing wherein like reference characters designate like parts through the several views:

Fig. 1 is a schematic layout of the improved fluid pumping system including the novel thermo-responsive regulator contemplated herein; and Fig. 2 is a longitudinal section through the thermo-responsive regulator; and Fig. 3 is a fragmentary section taken along line 3—3 of Fig. 2.

Referring now to the drawing and more particularly to Fig. 1 thereof, the reference character 10 designates a prime mover such as a fluid driven turbine, having an inlet conduit 12 connected to a source of pressurized operating fluid such as compressed air, not shown, and an exhaust conduit 14. To control the flow of the operating fluid through conduit 12, a conventional throttling valve 16 is mounted in conduit 12. Valve 16 is operated through an arm 18 that is connected through variable length link 20 with a conventional pressure motor 22. As shown schematically in Fig. 1, pressure motor 22 includes a casing 24 having a pressure responsive diaphragm 26 mounted therein that divides the interior of casing 24 into pressure compartments 28 and 30. Link 20 is secured at one end to arm 18, while its opposite end is secured to diaphragm 26. Thus, when diaphragm 26 is activated by a pressure differential between compartments 28 and 30, link 20 moves arm 18 so as to operate valve 16 and thereby control the flow of operating fluid through conduit 12 to turbine 10. Therefore, valve 16 and pressure motor 22 serve as control means for regulating the speed of turbine 10.

Turbine 10 is operatively connected through a shaft 32 with a conventional pump assembly 34. Pump 34 communicates through an inlet conduit 36 with a source of fluid to be pumped (not shown) and an outlet conduit 38 delivers pump output to a regulator 40. As will hereinafter be more fully set forth, regulator 40 is connected through suitable conduits 42 and 44 with chambers 28 and 30, respectively, of pressure motor 22, while a conduit 46 serves to deliver the fluid from regulator 40 to the point of its use.

Referring now to Fig. 2, regulator 40 includes a body or casing 48 fabricated from a material having a low coefficient of thermal expansion. Casing 48 is bored at one end thereof to provide an inlet port 50 that is suitably threaded for connection to one end of conduit 38, and which communicates at its inner end with a chamber 52 formed in casing 48. Chamber 52 is in axial alignment with inlet 50 and is substantially cylindrical in form throughout its length but tapers inwardly at one end in the direction of inlet port 50 to provide a tapered section 54, the purpose of which will hereinafter be more fully set forth. The end of chamber 52 opposite inlet port 50 is suitably threaded to receive an end plug 56, the inner end of which serves as an end wall 58 for chamber 52. Suitable gasket means 60 interposed between the end of casing 48 and peripheral flange 62 of plug 56 prevent leakage from chamber 52.

Casing 48 is also provided with a side outlet port 64 which communicates at its inner end with chamber 52 while its outer end is suitably threaded for connection to conduit 46. Casing 48 also includes pressure ports 66 and 68 which communicate at their respective inner ends with chamber 52 and which are threaded at their outer ends for connection to conduits 42 and 44, respectively. Pressure ports 66 and 68 are positioned so as to have the former communicated with chamber 52 at the inner or narrow end of tapered section 54 adjacent inlet port 50 while the latter communicates with chamber 52 at the outer or wider end of tapered section 54.

To control the flow of fluid through regulator 40 between the inlet and outlet ports 50 and 64, respectively, and further to provide means for effecting a pressure differential between the pressure of the fluid in ports 66 and 68, a metering disc 70 having a peripheral knife-edge 72 and a centrally disposed orifice 74 is adjustably mounted within chamber 52, so as to be operatively positioned between inlet and outlet ports 50 and 64, respectively, and pressure ports 66 and 68.

More particularly, disc 70 is provided with an internally threaded sleeve 76 having a plurality of side ports 78 formed therein adjacent central orifice 74 and a finger or guide 80 that is slidably engaged in a longitudinal slot or groove 82 formed in casing 48. Sleeve 76 is mounted on an externally threaded adjusting screw 84 that has an end section or tip 86 adapted to cooperate with orifice 74 to vary its effective area and thereby control flow therethrough. Screw 84 is also provided with a peripheral flange 88 medially of its length and a smooth shank portion 90 that passes through a suitable central opening formed in flange 56. A snap ring 92 operatively mounted in a suitable groove formed adjacent the outer end of screw 84 engages the outer surface of plug 56 to hold flange 88 into engagement with end wall 58 of plug 56. The outer end of screw 84 is provided with a slot 94 for receiving a suitable turning tool such as a screw driver or the like. A resilient ring 96 mounted in an internal annular groove formed in plug 56 and engaging shank 90 of screw 84 serves to prevent leakage from chamber 52 along shank 90 as well as to apply a friction load to screw 84.

Sleeve 76 and screw 84 are disposed in axial alignment with inlet port 50 and are so designed and constructed that when sleeve 76 is mounted on screw 84, disc 70 is positioned between inlet port 50 and outlet port 64 and also between pressure ports 66 and 68. Moreover, central orifice 74 is in axial alignment with inlet port 50 and knife edge 72 of disc 70 is positioned to cooperate with tapered section 54 to define an annular orifice 98. Moreover, when screw 84 is rotated, finger 80 which is engaged in slot 82 prevents sleeve 76 from rotating with the result that the latter moves longitudinally along screw 84 thereby moving knife edge 72 relatively to tapered section 54 and central orifice 74 relative to tip 86 to the end that the effective areas of orifices 98 and 74 are varied. Thus, screw 84 serves as means for manually adjusting the effective areas of orifices 98 and 74.

In addition to the manual means for adjusting the effective areas of orifices 98 and 74 above set forth, means are also provided to vary the effective areas of these orifices in response to and as a function of the temperature of the fluid passing through regulator 40. As hereinbefore set forth, casing 48 is fabricated from a material having a low coefficient of thermal expansion. Disc 70, sleeve 76 and screw 84, however, are fabricated from a material having a high coefficient of thermal expansion relative to the material from which casing 48 is fabricated. For example, casing 48 may be made from Invar, while disc 70, sleeve 76 and screw 84 may be made from a suitable aluminum alloy. Due to the foregoing construction and arrangement of parts, disc 70, sleeve 76 and screw 84 expand or contract to a much greater degree than casing 48 and hence tapered section 54 in response to changes in temperature. Moreover, for practical purposes it may be said that the dimensions of casing 48 and in particular, the tapered section 54 thereof remain relatively fixed in the presence of varying temperatures while the dimensions of disc 70, sleeve 76 and screw 84 vary as a function of temperature. Thus, in the presence of increasing temperature disc 70, sleeve 76 and screw 84 expand both laterally and longitudinally, the latter being the greater expansion, with the end result that disc 70 and hence knife edge 72 thereof moves toward tapered section 54 thereby decreasing the effective area of orifice 98. Similarly, the adjacent coacting surfaces of central orifice 74 and tip 86 move toward each other thereby decreasing the effective area of central orifice 74. Conversely, in response to decreasing temperature the relative contraction of the parts above set forth results in increasing the effective area of orifices 98 and 74. It is manifest from the foregoing that the effective areas of orifices 98 and 74 vary as a function of the temperature of the fluid passing through regulator 40. It will be apparent to one skilled in the art that by properly selecting the materials from which casing 48, disc 70, sleeve 76 and screw 84 are made, and by properly dimensioning tapered section 54 relative to the knife edge 72 of disc 70 and central orifice 74 relative to the tip 86 of screw 84, for a given change in temperature a given change can be effected in the effective areas of orifices 98 and 74. Moreover, as shown in Fig. 2, tapered section 54 and central orifice 74 are frusto-conical in form and tip 86 is conical. It is understood, however, that the sloping side walls of these elements may be curved inwardly or outwardly to provide a desired flow through orifices 98 and 74.

As above set forth, disc 70 is positioned between inlet port 50 and outlet port 64. It is manifest, therefore, that when a fluid is delivered to regulator 40 through conduit 38, the flow of the fluid between inlet and outlet ports 50 and 64, respectively, is controlled or regulated by the combined effective areas of orifices 98 and 74. Moreover, since disc 70 is positioned between ports 66 and 68 it is apparent that the pressure drop across disc 70, produced by the flow through orifices 98 and 74, serves to establish a pressure differential between the pressure of the fluid in port 66 and hence conduit 42 and the pressure of the fluid in port 68 and hence conduit 44. Thus, disc 70 serves to control or regulate the supply of fluid delivered to outlet 46 as well as to produce a pressure differential between pressure ports 66 and 68 as a function of the temperature of the fluid passing through regulator 40.

Having thus described the details of construction and arrangement of the novel fluid pumping system contemplated herein, it will be apparent to one skilled in the art that when the various elements of the system are assembled substantially as shown in Fig. 1, the system may be brought into balance through the adjustment of valve 16 and regulator 40. More particularly, arm 18 of valve 16 is displaced either manually or by a suitable mechanism (not shown) so as to initiate the flow of operating fluid through conduit 12 to turbine 10 where it is effective to rotate the same and the output shaft 32 thereof which in turn operates pump 34 to pump the fluid from conduit 36 to conduit 38 from whence it is delivered to the inlet port 50 of regulator 40. The fluid then passes through annular orifice 98 and central orifice 74 and side ports 78 to outlet port 64 and thence into supply conduit 46. By rotating screw 84, the effective areas of orifices 98 and 74 are varied until the desired supply of fluid is delivered to outlet port 64. The pressure drop across disc 70 occasioned by this flow produces a pressure differential between the fluids in pressure ports 66 and 68 that is transmitted through conduits 42 and 44, respectively, to chambers 28 and 30 of motor 22 where it is effective on opposite sides of diaphragm 26. The length of link 20 is then adjusted to the end that arm 18 is held in its then adjusted position by the diaphragm 26. During the foregoing adjustment, the temperature of the fluid is maintained, if necessary, at a substantially constant value.

Due to the foregoing adjustment, the system is in balance and delivers a substantially constant supply of fluid to supply conduit 46. If however, the temperature of the fluid in conduit 36 varies, for example, increases, pump 34 will unload. Turbine 10 will then increase its speed with the result that the output of pump 34 increases and a greater quantity of fluid will be delivered to regulator 40. Concurrently with the increase in fluid temperature, however, disc 70, sleeve 76 and screw 84 expand thereby diminishing the effective areas of orifices 98 and 74 and restricting flow from inlet port 50 to outlet port 64. Disc 70, therefore, serves to meter the flow of fluid through regulator 40 so as to maintain the supply of fluid delivered to outlet port 64 and hence supply conduit 46 at a substantially constant value. Further, the pressure drop across disc 70 occasioned by this flow varies the pressure differential between pressure ports 66 and 68 in that the pressure in the former increases relatively to the pressure in the latter. This relative increase in the pressure in port 66 is transmitted through conduit 42 to chamber 28 where it becomes effective on diaphragm 26 to move it in the direction of chamber 30. This movement of diaphragm 26 is transmitted through link 20 to arm 18 of valve 16 to adjust the valve so as to decrease the supply of operating fluid delivered through conduit 12 to turbine 10. The speed of turbine 10 and hence the output of pump 34 will then decrease bringing the system once more into balance.

It will be apparent also to those skilled in the art that in the event the temperature of the fluid should decrease, thus increasing the loading of pump 34 and decreasing its output, disc 70 will contract to effect an increase in the effective areas of orifices 98 and 74 thereby maintaining a substantially constant flow to supply conduit 46. Simultaneously, the pressure differential between ports 66 and 68 and hence chambers 28 and 30 will now effect a displacement of link 20 that will actuate arm 18 of valve 16 to adjust the latter so as to increase the delivery of operating fluid to turbine 10 thereby increasing the speed of turbine 10 and hence the output of pump 34 to once more restore the system to balance.

Having thus described the details of construction, arrangement and operation of the novel fluid pumping system contemplated herein, it will be apparent to one skilled in the art that the various objects of the invention heretofore set forth have been achieved. Further, it is understood that various changes and modifications of the improved pumping system described herein may be made by those skilled in the art without departing from the scope of the invention.

What is claimed is:

1. The combination comprising a casing, a chamber in said casing having an inlet in one end, a side outlet, and a section tapering outwardly from said inlet to said outlet, a screw mounted in the end wall of said chamber to extend into said chamber in axial alignment with said inlet and having an end section adjacent said inlet, said screw mounted for rotary movement in said chamber, a sleeve operatively engaging said screw and having a forward end extending beyond the limits of the end section of said screw, one or more ports through said sleeve adjacent the forward end thereof communicating the interior of said sleeve with said chamber, a disc carried by the forward end of said sleeve and disposed normally thereto, said disc having a peripheral knife edge adapted for cooperation with said tapered section and a central orifice adapted for cooperation with the end section of said screw, and adjustment means including means restraining said sleeve from rotation on said screw whereby rotation of said screw moves said disc and sleeve longitudinally in said chamber whereby said knife edge is disposed relative to said tapered section to define therewith an annular orifice between said inlet and outlet and said central orifice is positioned relative to the end section of said screws to determine the effective area of said central orifice.

2. The combination comprising a casing, a chamber in said casing having an inlet in one end, a side outlet, and a section tapering outwardly from said inlet to said outlet, a screw mounted in the end wall of said chamber to extend into said chamber in axial alignment with said inlet and having an end section adjacent said inlet, said screw mounted for rotary movement in said chamber, a sleeve operatively engaging said screw and having a forward end extending beyond the limits of the end section of said screw, one or more ports through said sleeve adjacent the forward end thereof communicating the interior of said sleeve with said chamber, a disc carried by the forward end of said sleeve and disposed normally thereto, said disc having a peripheral knife edge adapted for cooperation with said tapered section and a central orifice adapted for cooperation with the end section of said screw, adjustment means including means restraining said sleeve from rotation on said screw whereby rotation of said screw moves said disc and sleeve longitudinally in said chamber whereby said knife edge is disposed relative to said tapered section to define therewith an annular orifice between said inlet and outlet and said central orifice is positioned relative to the end section of said screws to determine the effective area of said central orifice.

3. The combination comprising a casing, a chamber in said casing having an inlet in one end, a side outlet, and a section tapering outwardly from said inlet to said outlet, a screw mounted in the end wall of said chamber to extend into said chamber in axial alignment with said inlet and having an end section adjacent said inlet, said screw mounted for rotary movement in said chamber, a sleeve operatively engaging said screw and having a forward end extending beyond the limits of the end section of said screw, one or more ports through said sleeve adjacent the foward end thereof communicating the interior of said sleeve with said chamber, a disc carried by the forward end of said sleeve and disposed normally thereto, said disc having a peripheral knife edge adapted for cooperation with said tapered section and a central orifice adapted for cooperation with the end section of said screw, and adjustment means including means restraining said sleeve from rotation on said screw whereby rotation of said screw moves said disc and sleeve longitudinally in said chamber whereby said knife edge is disposed relative to said tapered section to define therewith an annular orifice between said inlet and outlet and said central orifice is positioned relative to the end section of said screws to determine the effective area of said central orifice, said screw, sleeve and disc being fabricated of a material having a high coefficient of thermal expansion relative to the coefficient of thermal expansion of said casing whereby the effective area of each of said orifices is varied as a function of the temperature of a fluid passing through said casing.

4. For use with a differential fluid pressure sensitive device; valve mechanism comprising a casing, a chamber in said casing having an inlet, an outlet and a section tapering from said outlet to said inlet, an internally threaded sleeve longitudinally movable in the tapered section and including a disc at one end having a peripheral edge cooperating with said tapered section to define an annular orifice between said inlet and outlet, the disc also having an axial port communicating the inlet with the outlet through apertures in the sleeve, a valve stem manually rotatable in said casing, said disc and sleeve supported on the valve stem, and said valve stem including a screw threaded portion cooperable with the internally threaded sleeve to move the disc and sleeve longitudinally of the tapered section and relative to an axial end of the valve stem so as to vary the annular orifice in one sense and to vary the axial opening in proportion thereto in a reverse sense, and the casing including a pair of fluid pressure conduits for connection to the differential fluid pressure sensitive device, said fluid pressure conduits communicating with the chamber through the tapered section to opposite sides of the disc.

5. For use with a differential fluid pressure sensitive device; valve mechanism comprising a casing providing a chamber having an inlet, an outlet and a tapered section between the inlet and outlet, a disc member adjustably mounted in the chamber and disposed normal to the tapered section to define therewith an annular orifice controlling flow between the inlet and outlet, the disc member having a conical axial port also communicating the inlet with the outlet, an elongated valve stem adjustably disposed axially of the chamber with respect to the axial port and having a conical end cooperable with the conical axial port to vary the effective area of the latter, said disc member supported on the valve stem in said chamber, the disc member and valve stem being formed of a material having a high coefficient of thermal expansion relative to that of the casing whereby the disc member moves radially with respect to the tapered section and the conical end of the valve stem moves axially with respect to the conical axial port to vary the effective areas of said orifice and port in the same sense in response to variations in the temperature of a fluid passing through said chamber from the inlet to the outlet, and the casing including a pair of fluid pressure conduits for connection to the differential fluid pressure sensitive device, said fluid pressure conduits communicating with the chamber through the tapered section to opposite sides of the disc member.

6. In a valve mechanism as in claim 5 wherein the desired position of the disc member in the chamber relative to the tapered section and the desired position of the conical end of the valve stem with respect to the conical axial port are adjustable, each in a sense opposed to the other, and common manually operable means is provided for simultaneously effecting such adjustments.

References Cited in the file of this patent

UNITED STATES PATENTS

| | | |
|---|---|---|
| 987,080 | Rankin | Mar. 14, 1911 |
| 1,002,080 | Patterson | Aug. 29, 1911 |
| 1,091,742 | Frizzell | Mar. 31, 1914 |
| 1,551,438 | Staley | Aug. 25, 1925 |
| 1,813,122 | Moore | July 7, 1931 |
| 1,814,630 | Myers | July 14, 1931 |
| 1,905,519 | Soderberg | Apr. 25, 1933 |
| 2,489,778 | Hornschuch | Nov. 29, 1949 |
| 2,549,625 | Moore | Apr. 17, 1951 |
| 2,658,522 | Coberly | Nov. 10, 1953 |
| 2,678,057 | Ifield | May 11, 1954 |